Aug. 14, 1934.                J. A. CHEAPE                1,970,489
                              LAWN MOWER
                           Filed Oct. 22, 1931
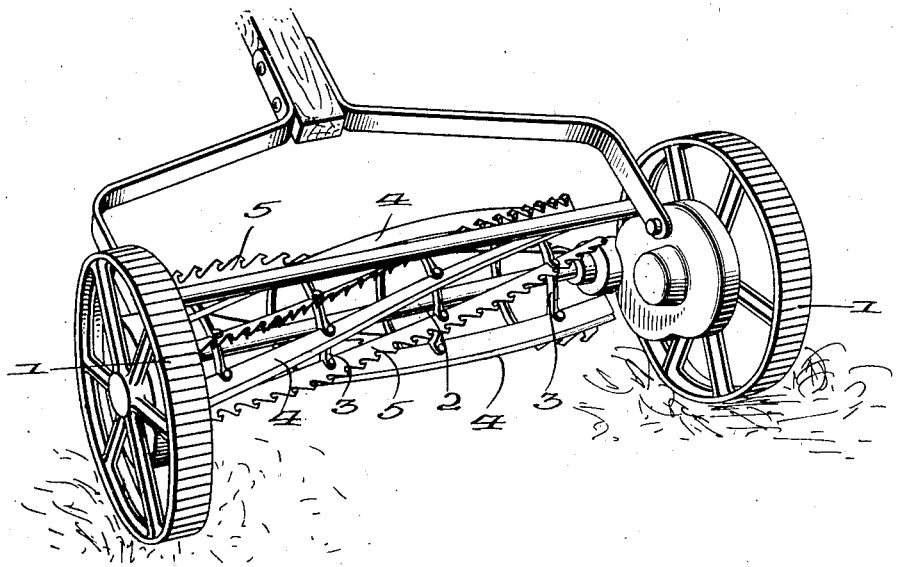
Fig. 1.
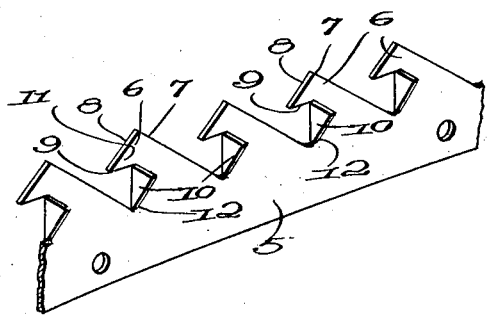
Fig. 2.
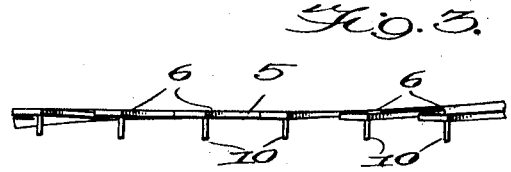
Fig. 3.
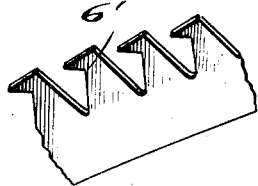
Fig. 4.                    Fig. 5.
Inventor
John Albert Cheape
By Vernon E. Hadsell
his Attorney Patented Aug. 14, 1934

1,970,489

UNITED STATES PATENT OFFICE 1,970,489

LAWN MOWER

John Albert Cheape, Charlottesville, Va.

Application October 22, 1931, Serial No. 570,473

17 Claims. (Cl. 56—294)

This invention relates to an improvement in lawn mowers.

The object of my invention is to provide an attachment for lawn mowers for gathering in tall grass and weeds and holding the same in such position that the cutting blades may cut the tall grass and weeds in their usual operation. At the same time, this attachment has provision for preventing an interweaving of the weeds, so that when they are cut, they fall from the machine with the other grass.

In the accompanying drawing:

Fig. 1 is a perspective view of a lawn mower, showing the invention applied thereto;

Fig. 2 is a detached perspective view of one of the rakes;

Fig. 3 is a top plan view thereof;

Fig. 4 is a detail perspective view of a slightly modified form of rake; and

Fig. 5 is a plan view of the same.

The lawn mower may be of the usual construction, in which the wheels are designated by the numeral 1 and drive the blade shaft 2 in the usual way. Mounted at intervals on the shaft 2 are a plurality of spiders 3; the arms of which carry the usual cutting blades 4.

Mounted on intermediate arms of the spiders 3, between cutting blades 4, are rakes 5, which rakes are fixed to the spider arms and are twisted slightly to lie parallel with the cutting blades 4, or spirally with respect to the blade shaft 2, that is to say the twist of the rakes corresponding with the twist of the cutting blades.

As shown in Figs. 2 and 3, the rake 5 is provided on one edge with a series of integrally formed rake teeth 6, the edges 7 and 8 of which converge to a point at their extreme outer ends, as shown particularly in Fig. 2. The edge 8 is undercut as at 9 to a distance approximately in vertical alignment with the point of the tooth to form a hook 11, and the undercut portion is bent aside at approximately right-angles to form a flange or guard 10. The undercut portion 9 forms a hook 11 on one edge only of each of the teeth, and which hook overlies the edge 7 of the next tooth. The outer edge 12 of the guard 10 is oblique or beveled to form an approximately triangular projection on one edge of each tooth. The purpose of these guards 10 is to prevent the weeds and tall grass from weaving in and out of the teeth of the rake.

In the modified form shown in Figs. 4 and 5, the rake teeth are formed similar to those shown in Figs. 2 and 3, but instead of using the guards 10 to prevent interweaving of the weeds, the outer ends of the rake teeth 6' are bent at an angle to the rake, that is to say the outer ends of hooks are angularly offset relative to the base portion of the rake, or in other words out of alignment with the base of the teeth as shown by the shaded lines in Fig. 4, and as illustrated in Fig. 5. It has been found that this relation also effectively prevents weaving of the weeds in the rake teeth.

As shown in Fig. 1, the teeth of alternate rakes 5 should be pointed in opposite directions in order to catch all of the weeds. If all of the teeth pointed in one direction many weeds would be missed that are caught by pointing the teeth in opposite directions.

In operating the machine, the blades cut in the usual fashion and the rakes catch and hook the tall grass blades and weeds, bending them to a position where they are caught between the stationary blade and the rotary blades and cut in the usual manner. The angular relation of the outer ends of the teeth and the opposite disposition of the teeth of succeeding rakes cause the rake teeth to engage all of the weeds so that few if any, escape being cut.

At the same time, the weeds are prevented from interweaving with the rake teeth either by the guards 10 or by the angular disposition of the teeth in the form shown in Figs. 4 and 5, in which the hooks are disposed spirally out of alignment with the remainder of the tooth.

I have found from actual use of these improvements that they effectively accomplish the results set forth.

I claim:

1. In a lawn mower, a rake having a plurality of teeth formed on an edge thereof, each tooth having edges arranged at an angle to each other and converging to a point at the outer end of the tooth, one of the edges extending in an approximately straight line from the outer end to the base of the tooth, and the other edge having a hook formed thereon overlapping a portion of the straight edge of the next adjacent tooth, the under edge of the hook extending inwardly of the tooth to a point approximately under the point of the tooth, thence to the inner end of the straight edge of the next adjacent tooth.

2. In a lawn mower, a rake having a plurality of teeth thereon, each of the teeth having a hook formed on one side only thereof and overlapping a portion of the adjacent edge of the next tooth.

3. In a lawn mower, a rake having a plurality of teeth thereon, each of the teeth having a hook formed on one side only thereof and overlapping a portion of the adjacent edge of the next tooth, and means on the teeth for preventing interweaving of weeds with the rake teeth.

4. In a lawn mower, a rake having a plurality of teeth, and means on the teeth for preventing interweaving of weeds with the teeth.

5. In a lawn mower, a rake having a plurality of teeth formed on an edge thereof, each of the teeth having edges arranged at an angle to each other, one of the edges having a laterally projecting hook overlapping a portion of the edge of the next adjacent tooth, and having an approximately triangularly shaped guard projecting from the side of the tooth.

6. In a lawn mower, a rake having a plurality of teeth formed on an edge thereof, each of the teeth having edges arranged at an angle to each other, one of the edges extending in an approximately straight line from the outer end to the base of the tooth, the other edge having an undercut portion forming a hook overlapping a portion of the straight edge of the next adjacent tooth, the undercut portion having a laterally bent flange extending from the edge thereof and arranged to form a guard at a side of the tooth.

7. In a lawn mower, the combination of a plurality of cutting blades, and a plurality of rakes arranged intermediate the cutting blades, each of the rakes having teeth, the teeth of every other rake pointing in opposite directions.

8. In a lawn mower, a rotating rake having a plurality of teeth on an edge thereof, each of the teeth having a hook on an edge thereof, said hook disposed approximately parallel with the axis of rotation of the rake to prevent interweaving of weeds or the like with the teeth.

9. In a lawn mower, a rotating rake having a plurality of teeth, each of the teeth having a hook disposed approximately parallel with the axis of rotation of the rake to prevent interweaving of weeds or the like with the teeth.

10. A rake for a lawn mower including a plurality of teeth, the opposite edges of each tooth converging to a point at its outer end, one of the edges inclined and extending approximately straight from the outer end of the base of the tooth, and the other edge extending in a radial direction and having a hook formed thereon, which overlaps a portion of the straight edge of the next adjacent tooth of the rake.

11. A rake for a lawn mower including a plurality of teeth, the opposite edges of each tooth converging to a point at its outer end, one of the edges extending in an approximately straight line from the outer end to the base of the tooth, and the other edge having an undercut portion forming a hook at the outer end of the tooth which overlaps a portion of the straight edge of the next adjacent tooth.

12. In a lawn mower, a rake having a plurality of teeth, and guards projecting from each tooth for preventing interweaving of weeds with the teeth.

13. In a lawn mower, the combination with a blade shaft, spiders secured thereon, and cutting blades secured to the spiders, of a rake secured to the spiders between each two cutting blades, every other rake having teeth extending in opposite directions.

14. In a lawn mower, the combination with a blade shaft, spiders secured thereon, and cutting blades secured to the spiders, of a rake secured to the spiders between each two cutting blades, every other rake having teeth extending in opposite directions, the outer ends of the teeth terminating in hooks bent out of alignment with the main body of the tooth.

15. In a lawn mower, a rotating rake having a plurality of teeth on the outer edge thereof, each of the teeth having a hook on an edge thereof, said hooks being angularly offset relative to a face plane of the rake.

16. In a lawn mower having a stationary cutting blade, rotating cutting blades to cooperate with said stationary blade, a plurality of rakes arranged intermediate said rotating blades and rotatable therewith, said rakes having a plurality of teeth on the outer edges thereof, each of the teeth having a hook on an edge thereof, said hooks being angularly offset relative to the forward face plane of the rakes.

17. In a lawn mower having a stationary cutting blade, rotating cutting blades to cooperate with said stationary blade, a plurality of rakes arranged intermediate said rotating blades and rotatable therewith, said rakes having a plurality of teeth on the outer edge thereof, each of the teeth having a hook on an edge thereof, the hooks of alternate rakes pointing in opposite directions, said hooks being angularly offset relative to the forward face planes of the rakes.

JOHN ALBERT CHEAPE.